United States Patent
Terasaki et al.

(10) Patent No.: US 10,967,485 B2
(45) Date of Patent: Apr. 6, 2021

(54) CLAMPING APPARATUS

(71) Applicant: SMC CORPORATION, Chiyoda-ku (JP)

(72) Inventors: Atsushi Terasaki, Kasukabe (JP); Kazuyoshi Takahashi, Koto-ku (JP); Atsushi Tamai, Moriya (JP); Koichi Katsumata, Joso (JP)

(73) Assignee: SMC CORPORATION, Chiyoda-ku (JP)

(*) Notice: Subject to any disclaimer, the term of this patent is extended or adjusted under 35 U.S.C. 154(b) by 240 days.

(21) Appl. No.: 16/327,558

(22) PCT Filed: May 29, 2017

(86) PCT No.: PCT/JP2017/019849
§ 371 (c)(1),
(2) Date: Feb. 22, 2019

(87) PCT Pub. No.: WO2018/037650
PCT Pub. Date: Mar. 1, 2018

(65) Prior Publication Data
US 2019/0184526 A1 Jun. 20, 2019

(30) Foreign Application Priority Data

Aug. 23, 2016 (JP) .............................. JP2016-162820

(51) Int. Cl.
*B25B 5/00* (2006.01)
*B25B 5/04* (2006.01)
(Continued)

(52) U.S. Cl.
CPC .................. *B25B 5/04* (2013.01); *B23Q 3/06* (2013.01); *B25B 5/122* (2013.01); *B25B 5/16* (2013.01)

(58) Field of Classification Search
CPC .... B25B 3/00; B25B 5/00; B25B 5/04; B25B 5/064; B25B 5/12; B23P 11/00;
(Continued)

(56) References Cited

U.S. PATENT DOCUMENTS 4,717,874 A 1/1988 Ichikawa et al.
6,364,301 B1 4/2002 Takahashi
(Continued)

FOREIGN PATENT DOCUMENTS

DE 10 2010 016 333 A1 10/2011
EP 0 636 449 A1 2/1995
(Continued)

OTHER PUBLICATIONS

Office Action dated Jun. 11, 2019 in corresponding Japanese Patent Application No. 2016-162820 (with English Translation), 10 pages.
(Continued)

*Primary Examiner* — Lee D Wilson
(74) *Attorney, Agent, or Firm* — Oblon, McClelland, Maier & Neustadt, L.L.P.

(57) ABSTRACT

A clamping apparatus is provided with: a metallic detector that is provided to a pivot shaft pivotally moving integrally with a clamp arm under the operation of a driving unit, in such a manner as to extend along the pivot shaft so as to be around the axis thereof; and one proximity sensor that is arranged so as to be opposed to the detector and that detects the magnetic loss of the detector. The detector is formed so that the area of a sensor opposing part opposed to a detection surface of the proximity sensor changes in association with the pivotal moving of the pivot shaft.

10 Claims, 14 Drawing Sheets

(51) Int. Cl.
*B23Q 3/06* (2006.01)
*B25B 5/12* (2006.01)
*B25B 5/16* (2006.01)

(58) Field of Classification Search
CPC ......... B23P 11/005; B23P 19/00; B23P 19/04; B23Q 3/00; B23Q 3/04; B23Q 3/06
See application file for complete search history.

(56) References Cited

U.S. PATENT DOCUMENTS

| | | | |
|---|---|---|---|
| 6,404,185 | B1 | 6/2002 | Allwine |
| 8,215,622 | B2 | 7/2012 | Fukui et al. |
| 2014/0232051 | A1 | 8/2014 | Higurashi |

FOREIGN PATENT DOCUMENTS

| | | |
|---|---|---|
| JP | 50-137761 A | 11/1975 |
| JP | 61-137001 A | 6/1986 |
| JP | 6-65961 B2 | 8/1994 |
| JP | 2001-113468 A | 4/2001 |
| JP | 2006-313121 A | 11/2006 |
| JP | 2013-52464 A | 3/2013 |
| TW | 200819255 | 5/2008 |

OTHER PUBLICATIONS

Indian Office Action dated Jun. 30, 2020 in Indian Patent Application No. 201947011173, 6 pages.
Korean Office Action dated Apr. 27, 2020 in Patent Application No. 10-2019-7008564 (with English translation), 9 pages.
International Search Report dated Aug. 8, 2017 in PCT/JP2017/019849 filed May 29, 2017.
Combined Chinese Office Action and Search Report dated May 26, 2020 in corresponding Chinese Patent Application No. 201780051814.X (with English Translation and English Translation of Category of Cited Documents), 14 pages.

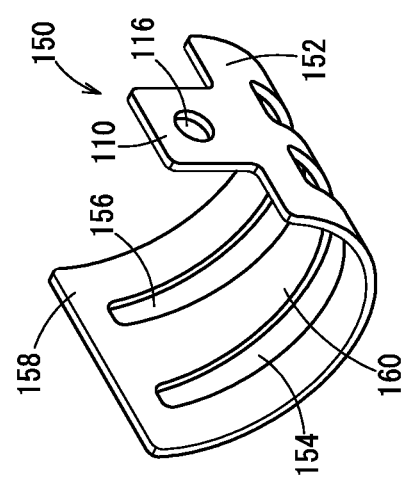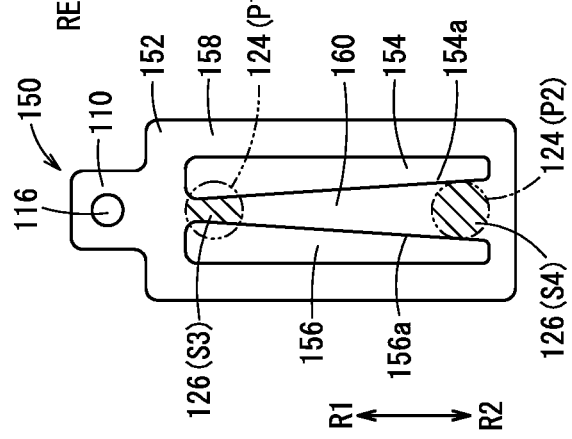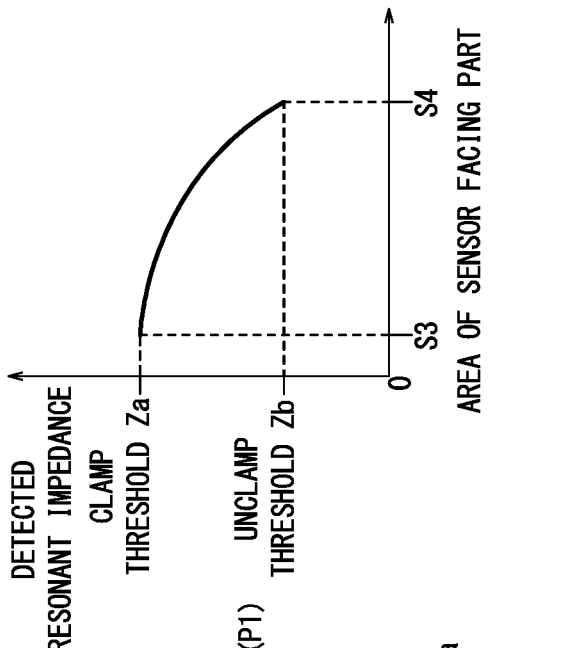

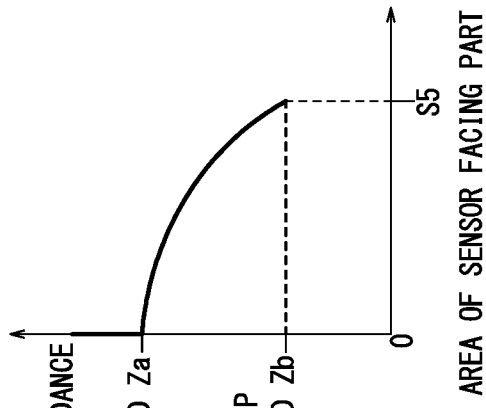
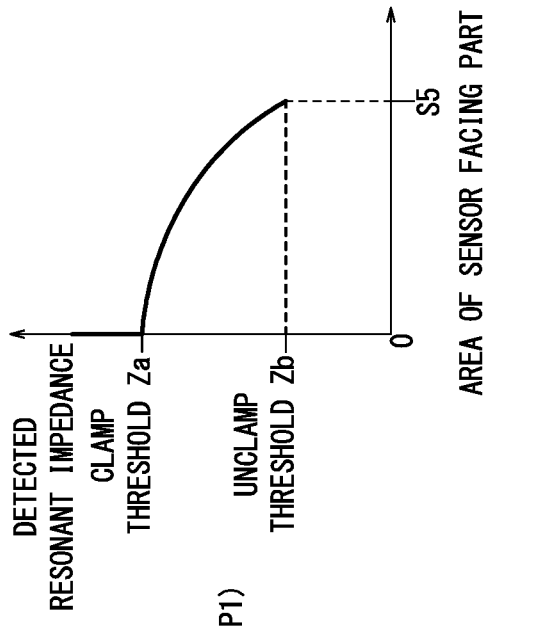
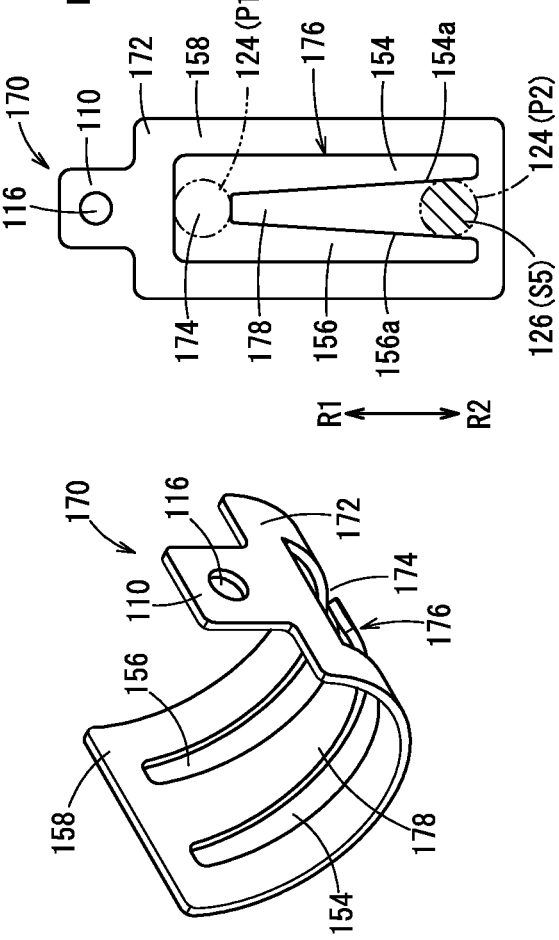

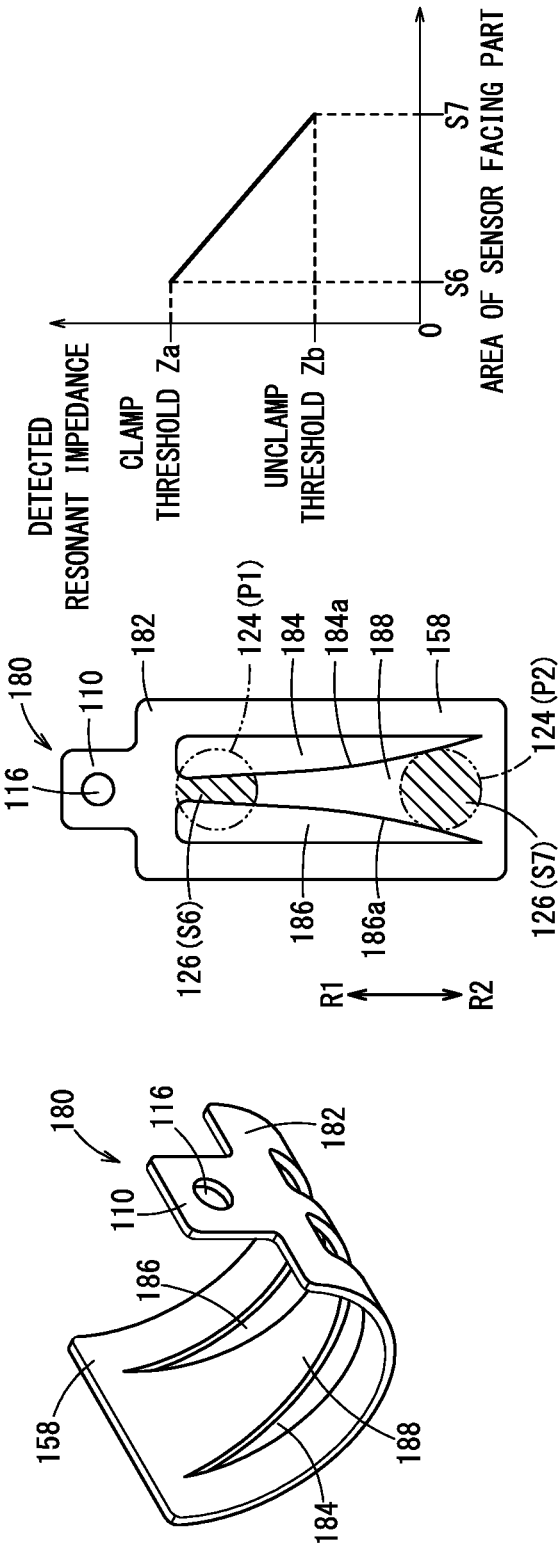

CLAMPING APPARATUS

TECHNICAL FIELD

The present invention relates to a clamp device (clamping apparatus) configured to clamp a workpiece by a rotatable clamp arm.

BACKGROUND ART

Conventionally, for example, in an automated assembly line of an automobile or the like, a welding process is performed in which a plurality of press-formed plates are welded to each other with the plates being clamped by a clamp device.

In this clamp device, the piston of the cylinder portion is displaced in the axial direction under the action of the fluid pressure, whereby the clamp arm is rotated via the toggle link mechanism connected to the piston rod. With this, the position of the clamp arm is switched between a clamping position and an unclamping position.

Japanese Laid-Open Patent Publication No. 2001-113468 discloses a clamp device that detects the rotational position of a clamp arm (the clamping state or the unclamping state) by detecting the position of a metal holding member, which is displaced together with a piston rod during a stroke, using two inductive proximity sensors. The clamp device adapts to change in the rotational angle range of the clamp arm by changing the plurality of holding members having shapes different from each other.

European Patent Application Publication No. 0636449 discloses a clamp device that detects the position of a piston rod by using two limit switches attached to a switch holder. The switch holder has a plurality of attachment holes for allowing the limit switches to be attached thereinto, in the axial direction of the piston rod, whereby the attachment positions of the limit switches can be changed.

SUMMARY OF INVENTION

In the case of Japanese Laid-Open Patent Publication No. 2001-113468, the rotational position (rotational angle) of the clamp arm is indirectly detected by detecting the position of the holding member displaced together with the piston rod during a stroke. Thus, the accuracy in detecting the position of the clamp arm is affected by, for example, the machining accuracy and the assembly accuracy of the toggle mechanism. Consequently, it is not easy to improve the accuracy in detecting the rotational position of the clamp arm.

Moreover, the clamp device described in Japanese Laid-Open Patent Publication No. 2001-113468 includes the two proximity sensors, resulting in an increase in the number of parts. Furthermore, complicated work of changing the holding member is required for changing the rotational angle range of the clamp arm.

In European Patent Application Publication No. 0636449, complicated work of changing the positions of the limit switches to the positions of the attachment holes corresponding to the degree of arm opening is required for changing the rotational angle range of a clamp arm.

The present invention has been devised taking into consideration the aforementioned problems, and has the object of providing a clamp device with a reduced number of parts, allowing direct and accurate detection of the rotational position of a clamp arm, and allowing easy change of the rotational angle range of the clamp arm.

To achieve the above-described object, a clamp device according to the present invention, configured to clamp a workpiece by a rotatable clamp arm, includes a clamp body, a driving unit provided on the clamp body, a rotating shaft configured to rotate together with the clamp arm in an integrated manner under operation of the driving unit, a detection target made of metal and provided on the rotating shaft so as to extend around an axis of the rotating shaft, and one proximity sensor disposed so as to face the detection target and configured to generate an eddy current in the detection target and detect magnetic loss, wherein the detection target is formed so that an area of a sensor facing part of the detection target that faces a detector surface of the proximity sensor changes with rotation of the rotating shaft.

According to the structure, change in the area of the sensor facing part caused by the rotation of the rotating shaft is detected by using one proximity sensor. Thus, it is possible to reduce the number of parts and detect the rotational position of the clamp arm directly and highly accurately. In addition, the rotational angle range of the clamp arm can be easily changed since neither changing of the detection target nor changing of the position of the proximity sensor is required.

In the above-described clamp device, the detection target may have a plate shape.

According to the structure, the detection target can be easily produced by press forming.

In the above-described clamp device, the detection target may include a long groove extending in a direction along which the detection target extends, so that the area of the sensor facing part changes with rotation of the rotating shaft.

According to the structure, the area of the sensor facing part can be easily changed using the long groove.

In the above-described clamp device, a side of the long groove may linearly extend in a direction intersecting with the direction along which the detection target extends.

According to the structure, the resonant impedance and the inductance of the proximity sensor can be nonlinearly changed.

In the above-described clamp device, a side of the long groove may extend in a curved manner.

According to the structure, the resonant impedance and the inductance of the proximity sensor can be linearly changed.

In the above-described clamp device, the long groove of the detection target may include one long groove, and the sensor facing part may extend over both sides of the long groove.

According to the structure, the structure of the detection target can be simplified, and a reduction in the rigidity is prevented.

In the above-described clamp device, the long groove of the detection target may include two long grooves arranged side by side in a width direction of the detection target, and the sensor facing part may be disposed between the two long grooves.

According to the structure, the area of the sensor facing part can be reliably changed by the rotation of the rotating shaft.

In the above-described clamp device, the detection target may include a communication groove through which ends of the two long grooves communicate with each other, and a groove width of the communication groove may be greater than or equal to a diameter of the detector surface.

According to the structure, the resonant impedance and the inductance of the proximity sensor can be made discontinuous (abruptly changed) when the detector surface faces the communication groove. Consequently, the clamping state or the unclamping state can be reliably detected even if the detected resonant impedance or the inductance of the proximity sensor varies due to change in temperature of the environment in which the clamp device is used.

In the above-described clamp device, the detection target may be secured to the rotating shaft by a screw member.

According to the structure, the detection target can be firmly secured to the rotating shaft. Thus, change in the distance between the sensor facing part and the detector surface can be prevented or reduced when the rotating shaft rotates.

In the above-described clamp device, an attachment portion having an insertion hole into which the screw member is inserted may be disposed at at least one end of the detection target in the direction along which the detection target extends.

According to the structure, the detection target can be firmly secured to the rotating shaft with a simple structure.

In the above-described clamp device, holding portions configured to hold an outer circumferential surface of the rotating shaft from outside in radial directions may be disposed at both ends of the detection target in the direction along which the detection target extends.

According to the structure, the detection target can be secured to the rotating shaft more accurately and firmly.

In the above-described clamp device, a recess portion may be formed in a region of the outer circumferential surface of the rotating shaft that faces the detector surface.

According to the structure, generation of eddy currents in the rotating shaft by the proximity sensor is prevented even when the rotating shaft is composed of metal.

According to the present invention, change in the area of the sensor facing part with the rotation of the rotating shaft is detected by using one proximity sensor. Thus, it is possible to reduce the number of parts, detect the rotational position of the clamp arm directly and highly accurately, and easily change the rotational angle range of the clamp arm.

The above-described object, features, and advantages will become more apparent from the following description of a preferred embodiment in conjunction with the accompanying drawings.

BRIEF DESCRIPTION OF DRAWINGS

FIG. 9A is a perspective view of a detection target according to a first modification, FIG. 9B is a development view of the detection target, and FIG. 9C is a graph illustrating a relationship between the area of the sensor facing part in the detection target and the detected resonant impedance;

FIG. 10A is a perspective view of a detection target according to a second modification, FIG. 10B is a development view of the detection target, and FIG. 10C is a graph illustrating a relationship between the area of the sensor facing part in the detection target and the detected resonant impedance;

FIG. 11A is a perspective view of a detection target according to a third modification, FIG. 11B is a development view of the detection target, and FIG. 11C is a graph illustrating a relationship between the area of the sensor facing part in the detection target and the detected resonant impedance;

DESCRIPTION OF EMBODIMENT

A preferred embodiment of a clamp device according to the present invention will now be described with reference to the accompanying drawings.

A clamp device 10 according to an embodiment of the present invention is configured to clamp a plurality of press formed plates such as steel plates during welding of the plates to each other, for example, in an automated assembly line for automobiles and the like.

Figure 1:
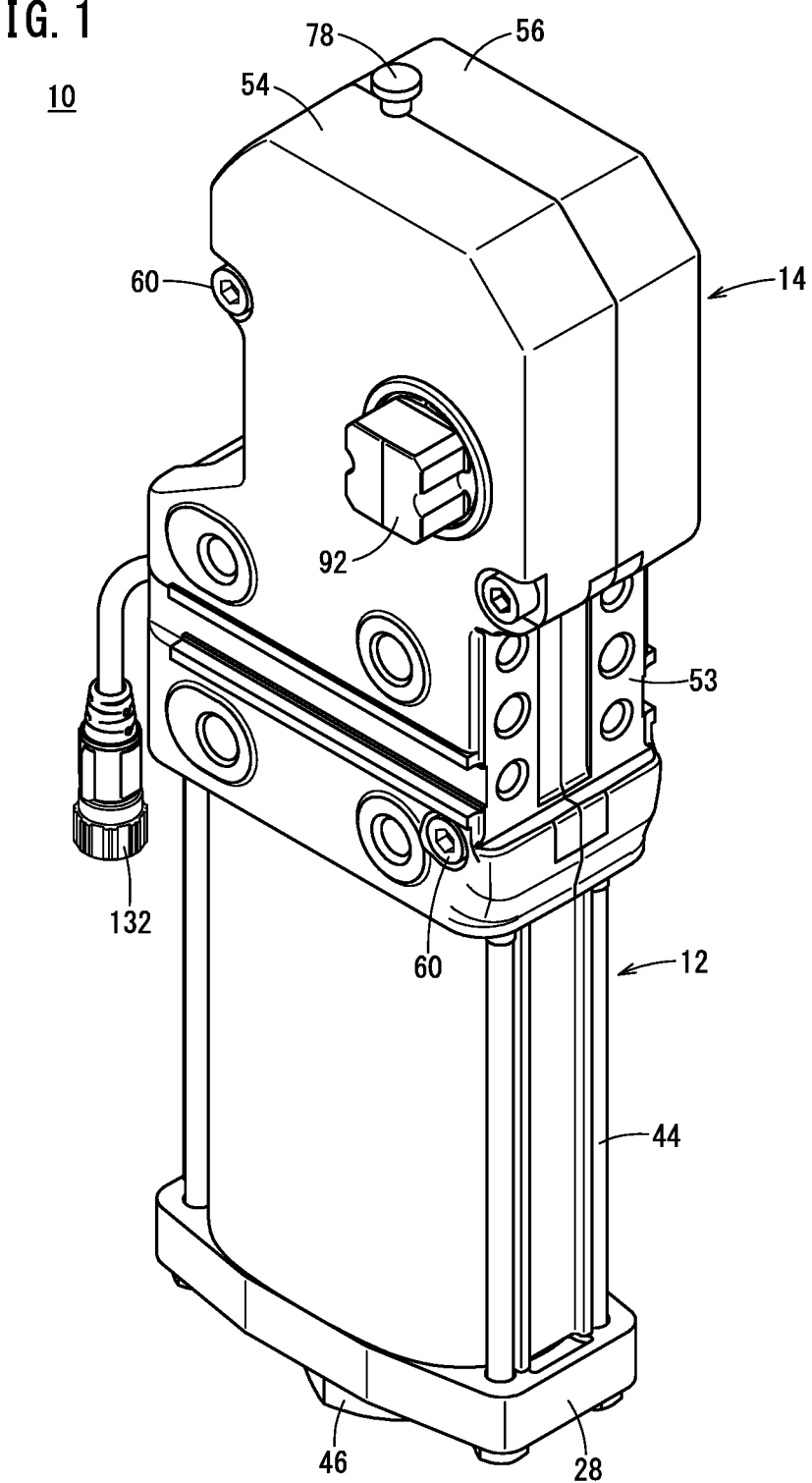
FIG. 1 is a perspective view of a clamp device according to an embodiment of the present invention.
Figure 2:
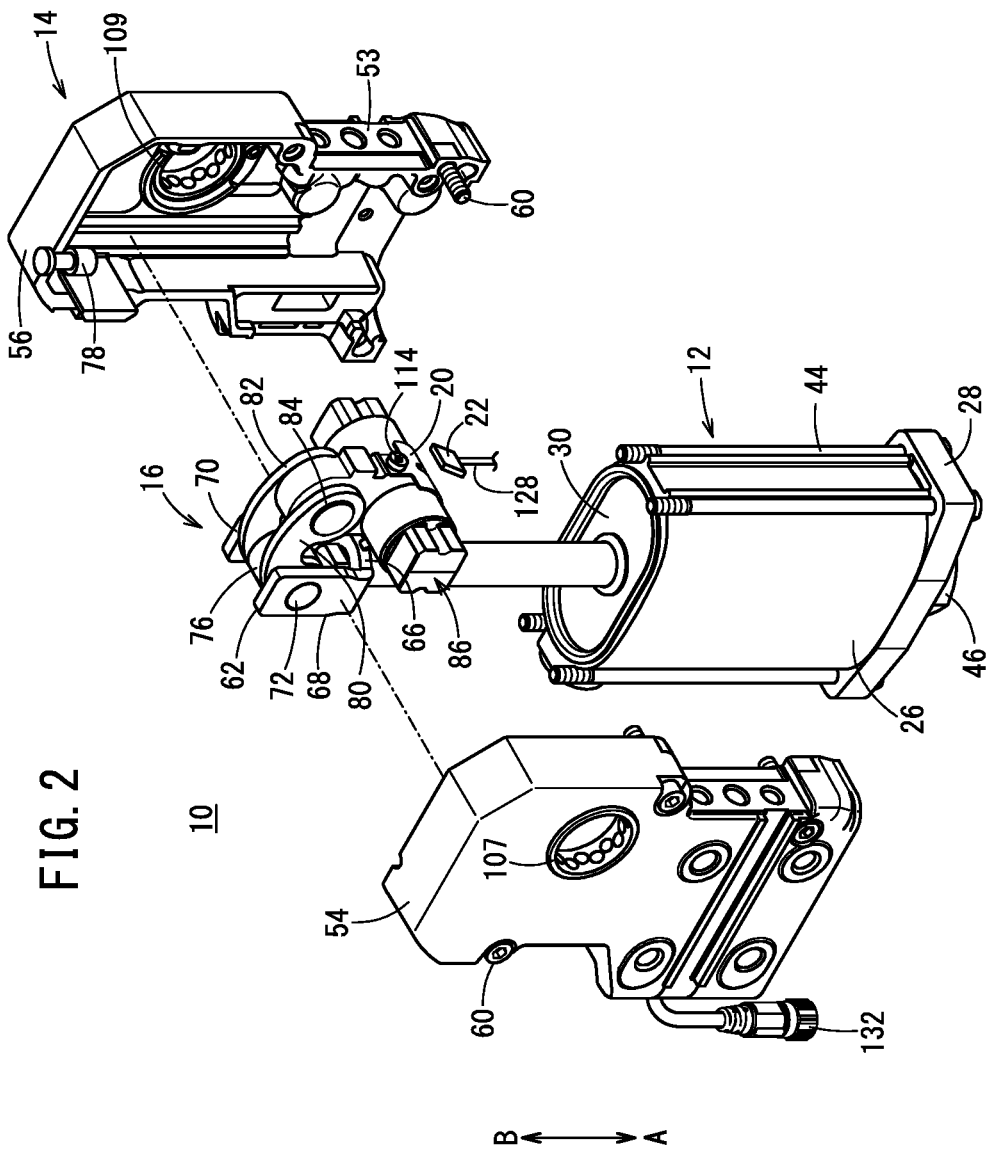
FIG. 2 is a partially exploded perspective view of the clamp device.
Figure 3:
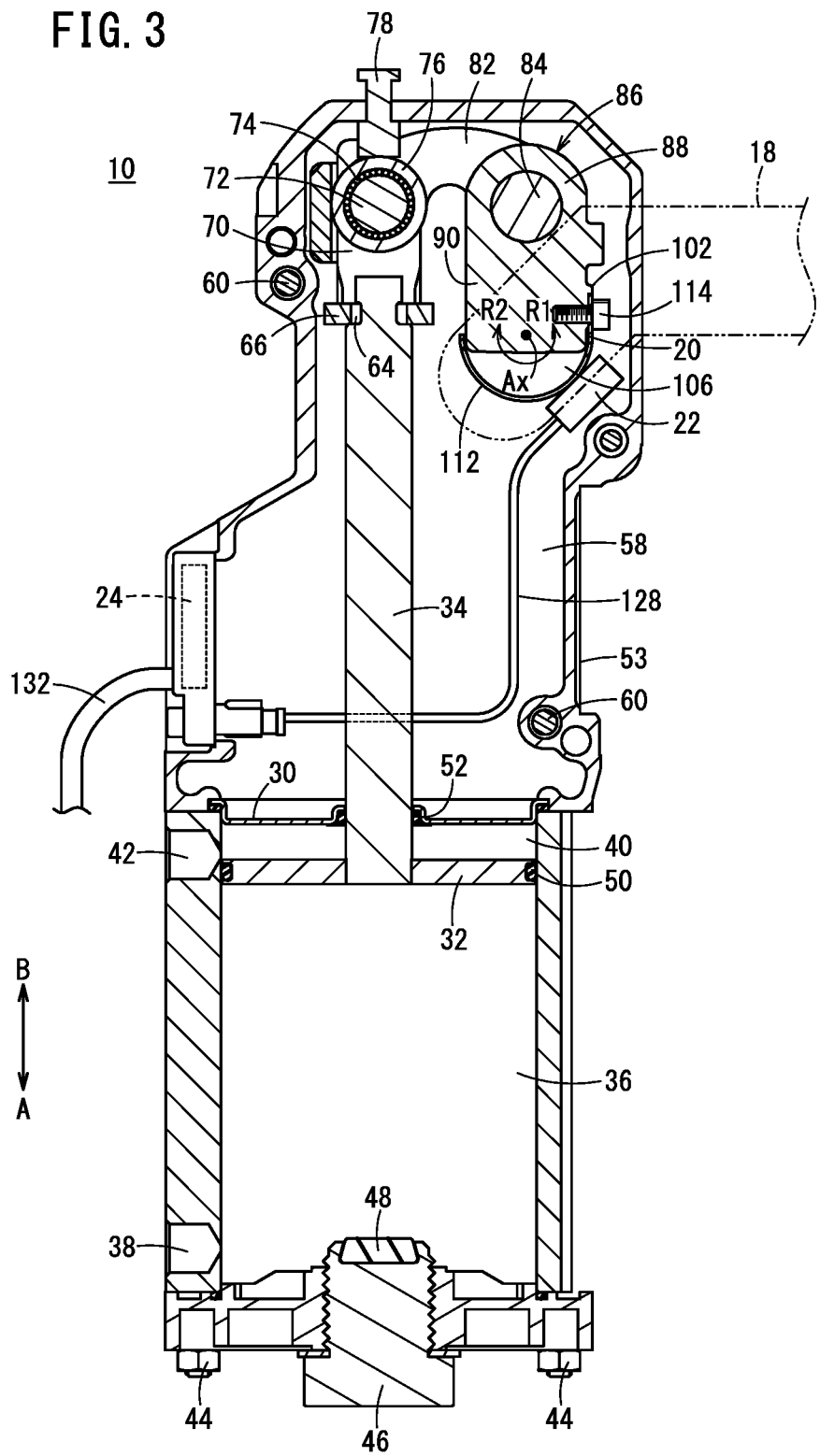
FIG. 3 is a longitudinal sectional view illustrating a clamping state of the clamp device.

As illustrated in FIGS. 1 to 3, the clamp device 10 includes a driving unit 12, a clamp body 14 connected with the driving unit 12, a link mechanism (power transmission mechanism) 16 disposed inside the clamp body 14, a clamp arm 18 configured to rotate via the link mechanism 16 under the action of the driving unit 12, a detection target 20, a proximity sensor 22, and a control unit 24.

The driving unit 12 is configured as a fluid pressure cylinder and includes a cylinder tube 26 having a flat tubular shape. The driving unit 12 may also be configured as an electric actuator. In FIG. 3, an opening of the cylinder tube 26 at one end (in a direction of an arrow A) thereof is closed by an end block 28, and an opening of the cylinder tube 26 at another end (in a direction of an arrow B) thereof is closed by a rod cover 30. A piston 32 is disposed inside the cylinder tube 26 so as to be displaceable in the axial direction, and the piston 32 is connected to a piston rod 34.

The shape of the cylinder tube 26 is not limited to the flat tubular shape, and may be any shape such as a shape of a perfect circular cylinder or a shape of an elliptical cylinder. The cylinder tube 26 includes a first port 38 communicating with a first cylinder chamber 36 formed between the end block 28 and the piston 32 and a second port 42 communicating with a second cylinder chamber 40 formed between the piston 32 and the rod cover 30.

Tubes (not illustrated) for supplying and discharging compressed fluid (driving fluid) to thereby reciprocate the piston 32 are connected to the first port 38 and the second port 42. The end block 28, the cylinder tube 26, and the rod cover 30 are connected to each other in an integrated manner by a plurality of fastening bolts 44.

An adjusting bolt 46 configured to adjust the stroke of the piston 32 to thereby adjust the rotational angle range of the clamp arm 18 (degree of arm opening) is screw-engaged with a substantially central part of the end block 28. The protruding length of the adjusting bolt 46 into the first cylinder chamber 36 can be adjusted under action of the screw-engagement. A damper 48 is attached to the head part of the adjusting bolt 46 located inside the first cylinder chamber 36 in order to relieve impact or impact noise caused by the piston 32.

A piston packing 50 having an annular shape is attached to the outer circumferential surface of the piston 32 via an annular groove. In addition, one end side of the piston rod 34 is secured to the center of the piston 32. A rod hole through which the piston rod 34 passes is formed in a central part of the rod cover 30. A rod packing 52 having an annular shape is attached to a wall surface defining the rod hole via an annular groove.

The clamp body 14 is composed of, for example, a metal material such as iron, stainless steel, or aluminum, and is connected to another end side of the rod cover 30. The clamp body 14 is provided with brackets 53 (see FIG. 1) to attach the clamp device 10 to a fixing member (not illustrated).

As illustrated in FIGS. 1 and 2, the clamp body 14 includes a pair of cover portions 54 and 56 each having a U-shaped cross-section. The cover portions 54 and 56 are substantially symmetrical and fastened together by a plurality of screw members 60 so as to form a chamber 58 (see FIG. 3) accommodating the link mechanism 16.

In FIGS. 2 and 3, a knuckle joint 62 is connected to another end of the piston rod 34. The knuckle joint 62 includes a base portion 66 having a hole 64 holding the other end of the piston rod 34, two side plate portions 68 and 70 protruding from the base portion 66 in the direction of the arrow B, and a knuckle pin 72 connecting the side plate portions 68 and 70. The two side plate portions 68 and 70 face each other in the thickness direction of the clamp body 14. An annular member 76 is mounted on the knuckle pin 72 via a bearing 74.

When the clamp arm 18 clamps a workpiece, the annular member 76 comes into contact with a pushing member 78 for releasing, which is provided on the clamp body 14, to thereby protrude the pushing member 78 to the outside of the clamp body 14 (in the direction of the arrow B) by a predetermined length. The pushing member 78 is a pin member extending in the axial direction of the piston rod 34. Each end of the pushing member 78 has a diameter larger than the diameter of the intermediate portion, whereby the pushing member 78 is prevented from falling off the clamp body 14. A user can release the workpiece from a clamped state (i.e., put the workpiece into an unclamped state) by pushing the pushing member 78 in the direction of the arrow A with a tool such as a hammer (see FIG. 7).

The link mechanism 16 converts the reciprocating movement of the piston 32 into a rotating movement of a rotating shaft 90 described below. The link mechanism 16 includes two link plates 80 and 82, a link pin 84, and a support lever 86. The link plate 80 is located between the annular member 76 and the side plate portion 68, and the link plate 82 is located between the annular member 76 and the side plate portion 70.

Each of the link plates 80 and 82 extends in an arc (semicircular arc). Each of the link plates 80 and 82 has a hole formed at one end portion and into which the knuckle pin 72 is inserted. Each of the link plates 80 and 82 has a hole formed at another end portion and into which the link pin 84 is inserted. More specifically, the link plates 80 and 82 are supported by the knuckle pin 72 and the link pin 84 so as to be rotatable relative to both the knuckle pin 72 and the link pin 84.

Figure 4:
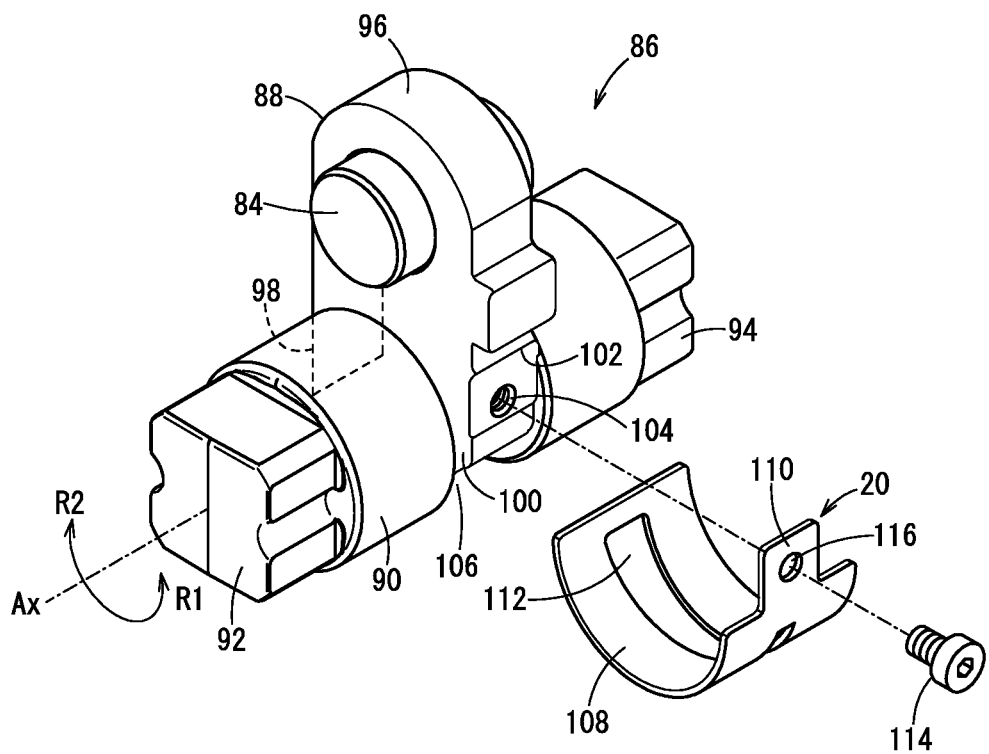
FIG. 4 is an exploded perspective view of a support lever and a detection target constituting the clamp device.

As illustrated in FIGS. 3 and 4, the support lever 86 is composed of, for example, a metal material. The support lever 86 may also be composed of a material such as resin, which does not cause eddy currents. The support lever 86 includes a support portion 88 supported so as to be rotatable relative to the link pin 84, the rotating shaft 90 integrated with the support portion 88 and protruding in a direction orthogonal to the axis of the piston rod 34, and arm attachment portions 92, 94 formed at both ends of the rotating shaft 90.

The support portion 88 is disposed in the center of the rotating shaft 90 in the axial direction and includes a support portion body 96 having a hole in which the link pin 84 is inserted, and two leg portions 98, 100 protruding from the support portion body 96 so as to straddle the rotating shaft 90. The leg portion 100 has, on a side thereof, a protrusion 102 protruding in a direction away from the piston rod 34 and a screw hole 104 for attaching the detection target 20.

A recess portion 106 is formed in the outer circumferential surface of the rotating shaft 90 at the center in the axial direction. The cross-section of the recess portion 106 taken along a line orthogonal to an axis Ax of the rotating shaft 90 is semicircular. The recess portion 106 is located on a side opposite a side on which the support portion body 96 lies. The size of the recess portion 106 in the axial direction of the rotating shaft 90 is smaller than the width of the detection target 20 and larger than the diameter of a detector surface 124 of the proximity sensor 22 described below. Both ends of the rotating shaft 90 are rotatably supported by bearings 107, 109 provided on the clamp body 14 (see FIGS. 1 and 2). The aim attachment portions 92, 94 are configured such that the clamp arm 18 is detachably attached to the aim attachment portions 92, 94.

Figure 5:
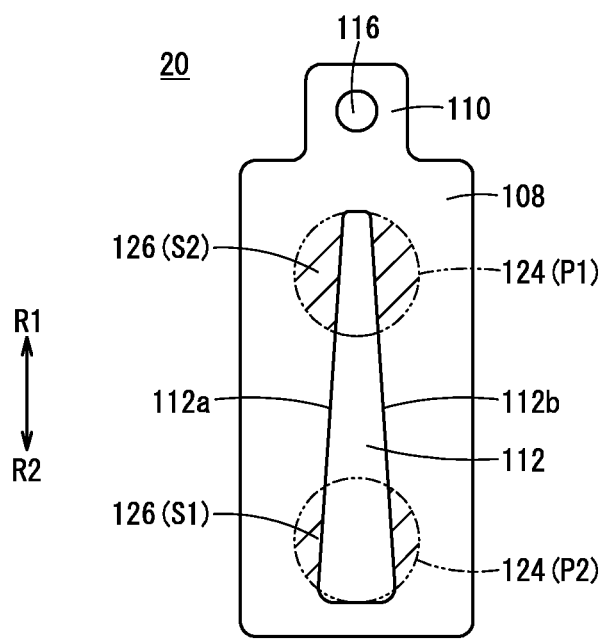
FIG. 5 is a development view of the detection target.

As illustrated in FIGS. 4 and 5, the detection target 20 is composed of a metal material such as pure iron, steel, copper, or aluminum. In other words, the detection target 20 is composed of a material in which eddy currents are generated by action of the proximity sensor 22. The detection target 20 is integrally formed by press forming a thin metal sheet.

The detection target 20 includes a body portion 108 extending around the axis of the rotating shaft 90 and an attachment portion 110 disposed at one end of the body portion 108 in an R1 direction. The body portion 108 is shaped by bending a substantially rectangular metal sheet into a substantially semicircular arc and provided so as to cover the recess portion 106 of the rotating shaft 90. A long groove (slit) 112 extending around the axis of the rotating shaft 90 (in a direction along which the body portion 108 extends) is formed in the middle of the body portion 108 in the width direction.

The long groove 112 has a substantially triangular shape. Sides 112a, 112b of the long groove 112 linearly extend in directions intersecting with the direction along which the body portion 108 extends. In other words, the sides 112a, 112b of the long groove 112 linearly extend so as to approach each other in the direction of the arrow R1. More specifically, the groove width of the long groove 112 gradually increases from the one end to another end of the body portion 108 (in a direction of an arrow R2). The attachment portion 110 having a rectangular shape protrudes from the one end of the body portion 108 at the middle in the width direction and has a screw insertion hole 116 in which a screw member 114 for securing the detection target 20 to the support lever 86 (rotating shaft 90) is inserted.

Figure 6:
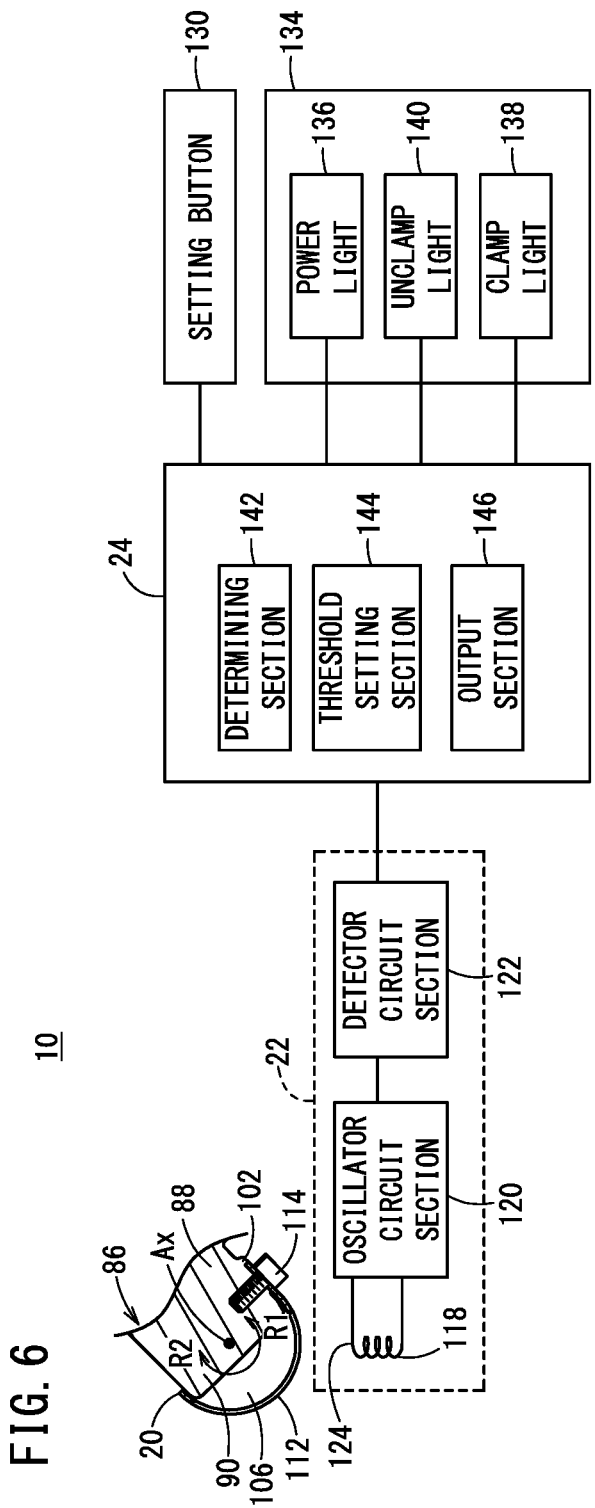
FIG. 6 is a block diagram of main parts of the clamp device.

As illustrated in FIG. 6, the proximity sensor 22 is configured as an inductive proximity sensor and includes a detector coil 118 disposed adjacent to the body portion 108 of the detection target 20, an oscillator circuit section 120 electrically connected to the detector coil 118, and a detector circuit section 122 electrically connected to the oscillator circuit section 120. The detector coil 118 is disposed such that the detector surface (coil surface) 124 of the detector coil 118 faces the body portion 108. Specifically, the detector coil 118 is positioned and secured to the clamp body 14 such that a sensor facing part 126 (see FIG. 5) of the body portion 108 facing the detector surface 124 extends over both sides of the long groove 112.

The oscillator circuit section 120 oscillates to drive the detector coil 118 at a predetermined oscillation frequency. The detector circuit section 122 detects resonant impedance (parallel resonant impedance) based on a signal output from the oscillator circuit section 120. More specifically, the proximity sensor 22 detects the rotational position (rotational angle) of the clamp arm 18 by detecting change in the area of the sensor facing part 126 caused by the rotation of the rotating shaft 90 as change in the resonant impedance.

In FIGS. 3 and 6, the control unit 24 is accommodated in a casing formed in the clamp body 14 and is electrically connected to the proximity sensor 22 by a lead wire 128. The casing is provided with a setting button 130 which a user can press and operate from outside, a connector 132 to which a cable connected with an external device (such as a power source) is connectable, and a display section 134 that can be visually confirmed from outside. As illustrated in FIG. 6, the display section 134 includes a power light 136, a clamp light 138, and an unclamp light 140.

The control unit 24 includes a determining section 142, a threshold setting section 144, and an output section 146. The determining section 142 determines whether the clamp device is in a clamping state (whether the clamp arm 18 is in a clamping position) based on a comparison between the resonant impedance detected by the detector circuit section 122 of the proximity sensor 22 (hereinafter referred to as "detected resonant impedance") and a clamp threshold Za. In addition, the determining section 142 determines whether the clamp device is in an unclamping state (whether the clamp arm 18 is in an unclamping position) based on a comparison between the detected resonant impedance and an unclamp threshold Zb.

The threshold setting section 144 sets the clamp threshold Za based on a signal (detected resonant impedance) output from the detector circuit section 122 when a first operation is performed on the setting button 130. In addition, the threshold setting section 144 sets the unclamp threshold Zb based on the detected resonant impedance when a second operation is performed on the setting button 130. The clamp threshold Za and the unclamp threshold Zb set by the threshold setting section 144 are stored in the controller. The output section 146 turns on and off the power light 136, the clamp light 138, and the unclamp light 140.

Figure 7:
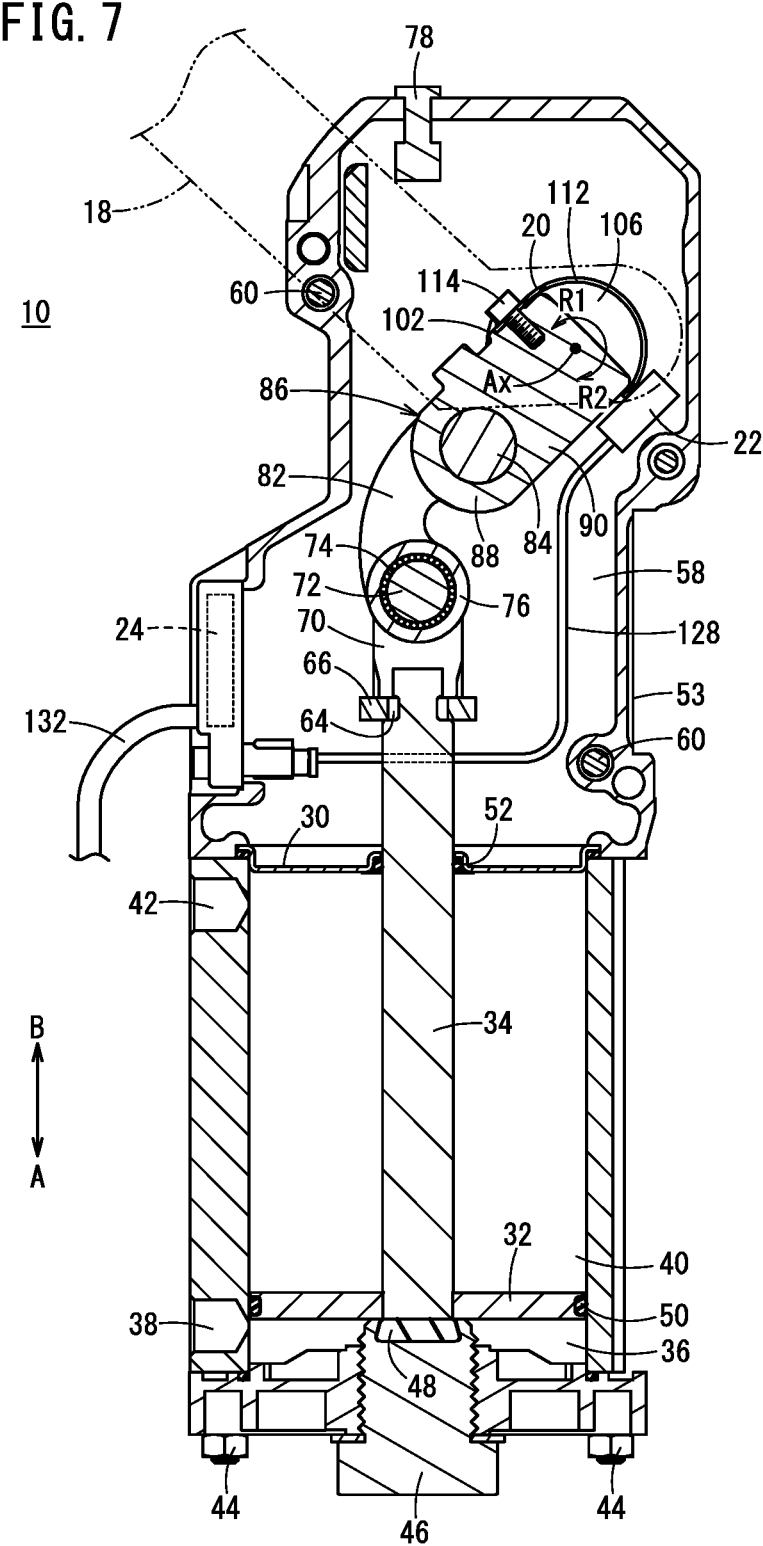
FIG. 7 is a longitudinal sectional view illustrating an unclamping state of the clamp device.

The clamp device 10 according to this embodiment is basically configured as above. Operations of the clamp device 10 will now be described. In the description below, the unclamping state illustrated in FIG. 7 is set as an initial state.

First, a user attaches the brackets 53 of the clamp device 10 to a fixing member (not illustrated). In addition, the user connects a cable to the connector 132 to connect the clamp device 10 to an external device (such as a power source). With this, power is supplied to the control unit 24, and the power light 136 is turned on.

In the initial state, the unclamp light 140 is turned on and the clamp light 138 is turned off. The piston 32 is located at the one end of the cylinder tube 26 adjacent to the end block 28 and is in contact with the damper 48. At this time, as illustrated in FIG. 5, the detector surface 124 of the proximity sensor 22 is disposed at a position P2 facing an end portion of the long groove 112 in the direction of the arrow R2, and the sensor facing part 126 of the body portion 108 that faces the detector surface 124 has an area S1.

When a workpiece is clamped, compressed fluid is supplied to the first port 38 while the second port 42 is open to the atmosphere. Then, as shown in FIG. 3, the piston 32 is displaced toward the rod cover 30 (in the direction of the arrow B). The linear motion of the piston 32 is transmitted to the link mechanism 16 via the piston rod 34 and the knuckle joint 62, and by rotation of the rotating shaft 90, the clamp arm 18 rotates together with the rotating shaft 90 in an integrated manner in the direction of the arrow R2 (clockwise in FIG. 3).

Figure 8:
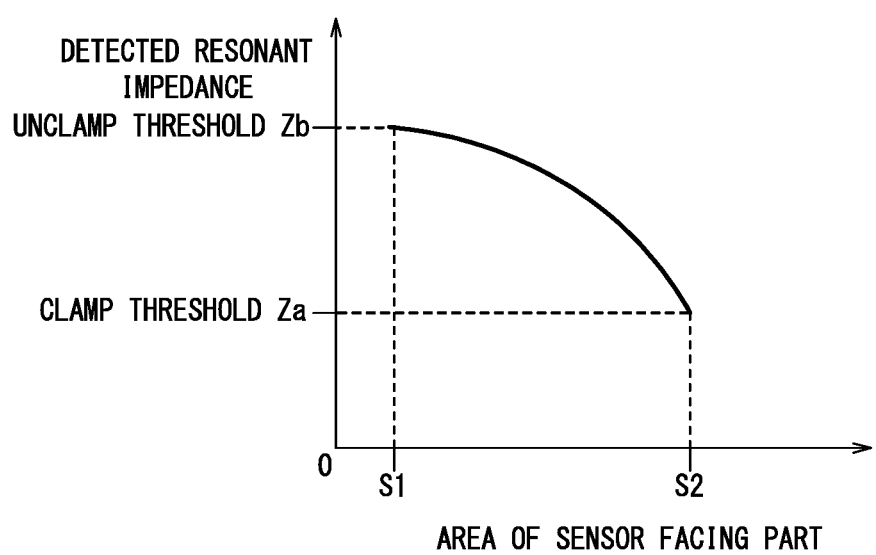
FIG. 8 is a graph illustrating a relationship between the area of a sensor facing part and the detected resonant impedance.

At this time, since the detection target 20 fixed to the support lever 86 also rotates with the rotating shaft 90 in an integrated manner, the detector surface 124 is displaced relative to the body portion 108 in the direction of the arrow R1. As a result, the area of the sensor facing part 126 increases, and the detected resonant impedance nonlinearly decreases (see FIGS. 5 and 8).

In a case where the detected resonant impedance is greater than the clamp threshold Za and less than the unclamp threshold Zb, the determining section 142 determines that it is in an intermediate state (a transition state from the unclamping state to the clamping state). At this time, the output section 146 turns off both the unclamp light 140 and the clamp light 138. As a result, the user can confirm that it is in the intermediate state, by visually checking that the unclamp light 140 and the clamp light 138 are turned off.

When the detector surface 124 is displaced to a position P1 facing an end portion of the long groove 112 in the direction of the arrow R1, the area of the sensor facing part 126 becomes S2. Note that the area S2 is larger than the area S1. At this time, the detected resonant impedance reaches the clamp threshold Za, and thus the determining section 142 determines that it is in the clamping state. In addition, the output section 146 turns on the clamp light 138 while keeping the unclamp light 140 off. As a result, the user can confirm that it is in the clamping state, by visually checking the clamp light 138. At this moment, the displacement of the piston 32 toward the rod cover 30 is stopped.

On the other hand, in a case where the workpiece is released from the clamped state, compressed fluid is supplied to the second port 42 while the first port 38 is open to the atmosphere. This causes the piston 32 to be displaced toward the end block 28 as illustrated in FIG. 7. The linear motion of the piston 32 is transmitted to the link mechanism 16 via the piston rod 34 and the knuckle joint 62, and by rotation of the rotating shaft 90, the clamp arm 18 rotates together with the rotating shaft 90 in an integrated manner in the direction of the arrow R1 (counter-clockwise in FIG. 7).

At this time, since the detection target 20 secured to the support lever 86 also rotates together with the rotating shaft 90 in an integrated manner, the detector surface 124 is displaced relative to the body portion 108 in the direction of the arrow R2. As a result, the area of the sensor facing part 126 decreases, and accordingly the detected resonant impedance nonlinearly increases (see FIG. 8).

In a case where the detected resonant impedance is greater than the clamp threshold Za and less than the unclamp threshold Zb, the determining section 142 determines that it is in an intermediate state (transition state from the clamping state to the unclamping state). At this time, the output section 146 turns off both the unclamp light 140 and the clamp light 138.

When the detector surface 124 is displaced to the position P2 facing the end portion of the long groove 112 in the direction of the arrow R2, the area of the sensor facing part 126 becomes S1. At this time, the detected resonant impedance reaches the unclamp threshold Zb, and thus the determining section 142 determines that it is in the unclamping state. In addition, the output section 146 turns on the unclamp light 140 while keeping the clamp light 138 off. At this moment, the piston 32 comes into contact with the damper 48, whereby the displacement of the piston 32 toward the end block 28 is stopped, and the rotation of the rotating shaft 90 and the clamp arm 18 is stopped.

In the clamp device 10 described above, adjustment of the degree of arm opening and setting of the clamp threshold Za and the unclamp threshold Zb are performed according to the shape and size of the workpiece.

To set the degree of arm opening, the length of the adjusting bolt 46 protruding inside the first cylinder chamber 36 is changed by screwing the adjusting bolt 46. As a result, the stroke length of the piston 32 is changed, so that the arm opening degree of the clamp arm 18, which rotates via the link mechanism 16 under the action of the linear motion of the piston 32, is changed. The length of the adjusting bolt 46 protruding inside the first cylinder chamber 36 is reduced to increase the degree of arm opening, and the length of the adjusting bolt 46 protruding inside the first cylinder chamber 36 is increased to reduce the degree of arm opening.

In addition, to change the clamp threshold Za, the piston 32 is displaced toward the rod cover 30 under the action of the fluid pressure, and the clamp arm 18 is brought into contact with the workpiece to thereby clamp the workpiece. In this state, the user keeps pressing the setting button 130 for a predetermined period of time or more (for example, for three seconds) (first operation). With this, the value of the detected resonant impedance at this time is reset as a new clamp threshold Za and stored in a memory of the control unit 24.

Furthermore, to change the unclamp threshold Zb, the user presses the setting button 130 for less than a predetermined period of time (for example, for about one second) (second operation) in a state that the clamp arm 18 is disposed at a predetermined rotational angle (unclamp angle). With this, the value of the detected resonant impedance at this time is reset as a new unclamp threshold Zb and stored in the memory of the control unit 24.

As described above, even when the shape and size of the workpieces is changed, the clamp threshold Za and the unclamp threshold Zb can be easily reset by pressing the setting button 130 in a state that the clamp arm 18 is disposed at a predetermined angle. In addition, both the clamp threshold Za and the unclamp threshold Zb can be set using one setting button 130 by changing the time for which the setting button 130 is pressed.

According to this embodiment, change in the area of the sensor facing part 126 caused by the rotation of the rotating shaft 90 are detected using one proximity sensor 22. This enables a reduction in the number of parts and also enables direct and accurate detection of the rotational position of the clamp arm 18. In addition, the rotational angle range of the clamp arm 18 (degree of arm opening) can be easily changed since changing of the detection target 20 or changing of the position of the proximity sensor 22 is not required.

In this embodiment, since the detection target 20 has a plate shape, the detection target 20 can be easily produced by press forming. In addition, the detection target 20 has the long groove 112 extending in the direction along which the detection target 20 extends, such that the area of the sensor facing part 126 changes as the rotating shaft 90 rotates. Thus, the area of the sensor facing part 126 can be easily changed using the long groove 112.

Moreover, the sides 112a, 112b of the long groove 112 linearly extend in the directions intersecting with the direction along which the detection target 20 extends. Thus, the resonant impedance of the proximity sensor 22 can be nonlinearly changed. Furthermore, since the sensor facing part 126 extends over both sides of the long groove 112, it is possible to simplify the structure of the detection target 20 and also prevent a reduction in rigidity.

In this embodiment, the attachment portion 110 is formed at one end portion of the detection target 20 in a direction along which the detection target 20 extends and has the screw insertion hole 116 in which the screw member 114 is inserted. Thus, with a simple structure, the detection target 20 can be firmly secured to the rotating shaft 90 (support lever 86). Owing thereto, change in the distance between the sensor facing part 126 and the detector surface 124 can be prevented or reduced when the rotating shaft 90 rotates.

In addition, the recess portion 106 is formed in a region of the rotating shaft 90 that faces the detector surface 124 when the rotating shaft 90 rotates. Thus, generation of eddy currents in the rotating shaft 90 by the proximity sensor 22 is prevented even when the rotating shaft 90 is composed of metal.

Next, a detection target 150 according to a first modification will be described with reference to FIGS. 9A to 9C. In the detection target 150, the same reference numerals and symbols are used for components identical to those in the detection target 20 described above, and the detailed descriptions will be omitted. In addition, parts in the detection target 150 common to those in the detection target 20 described above produce the same operational effects.

As illustrated in FIGS. 9A and 9B, the detection target 150 according to the first modification includes a body portion 152 extending around the axis of the rotating shaft 90 and an attachment portion 110 disposed at one end of the body portion 152 in the direction of the arrow R1. The body portion 152 has two long grooves 154, 156 extending around the axis of the rotating shaft 90 (i.e., extending in a direction along which the body portion 152 extends), the long grooves being arranged side by side in the width direction of the body portion 152.

Consequently, the body portion 152 is further provided with a rectangular outer frame portion 158 located around the long grooves 154, 156 and an intermediate portion 160 located between the long grooves 154, 156. The intermediate portion 160 extends around the axis of the rotating shaft 90. Both ends of the intermediate portion 160 in a direction along which the intermediate portion 160 extends are connected to the outer frame portion 158.

Each of the long grooves 154, 156 has a substantially triangular shape. Sides 154a, 156a of the long grooves 154, 156 closer to the intermediate portion 160 linearly extend in directions intersecting with the direction along which the body portion 152 extends. In other words, the sides 154a, 156a of the long grooves 154, 156 linearly extend so as to approach each other in the direction of the arrow R1. That is, the width of the intermediate portion 160 decreases in the direction of the arrow R1.

In a case where the above-described detection target 150 is used, in the initial state, the detector surface 124 of the proximity sensor 22 is disposed at the position P2 facing an end portion of the intermediate portion 160 in the direction of the arrow R2, and the sensor facing part 126 has an area S4. Note that the clamp threshold Za is greater than the unclamp threshold Zb.

As illustrated in FIGS. 9B and 9C, when a workpiece is clamped, the detector surface 124 is displaced relative to the body portion 152 in the direction of the arrow R1. As a result, the area of the sensor facing part 126 decreases, and the detected resonant impedance nonlinearly increases accordingly.

In a case where the detected resonant impedance is greater than the unclamp threshold Zb and less than the clamp threshold Za, the determining section 142 determines that it is in the intermediate state (a transition state from the unclamping state to the clamping state). When the detector surface 124 is displaced to the position P1 facing an end portion of the intermediate portion 160 in the direction of the arrow R1, the area of the sensor facing part 126 becomes S3. Note that the area S3 is smaller than the area S4. At this time, the detected resonant impedance reaches the clamp threshold Za, and thus the determining section 142 determines that it is in the clamping state.

On the other hand, when the workpiece is released from the clamped state, the detector surface 124 is displaced relative to the body portion 152 in the direction of the arrow R2. As a result, the area of the sensor facing part 126 increases, and accordingly the detected resonant impedance nonlinearly decreases.

In a case where the detected resonant impedance is less than the clamp threshold Za and greater than the unclamp threshold Zb, the determining section 142 determines that it is in the intermediate state (a transition state from the clamping state to the unclamping state). When the detector surface 124 is displaced to the position P2 facing the end portion of the intermediate portion 160 in the direction of the arrow R2, the area of the sensor facing part 126 becomes S4. At this time, the detected resonant impedance reaches the unclamp threshold Zb, and thus the determining section 142 determines that it is in the unclamping state.

According to this modification, the sensor facing part 126 is defined in the intermediate portion 160 located between the two long grooves 154, 156. Thus, the area of the sensor facing part 126 can be reliably changed by the rotation of the rotating shaft 90.

Next, a detection target 170 according to a second modification will be described with reference to FIGS. 10A to 10C. In the detection target 170, the same reference numerals and symbols are used for components identical to those in the detection target 150 described above, and the detailed descriptions will be omitted. In addition, parts in the detection target 170 common to those in the detection target 150 described above produce the same operational effects as the detection target 150. The same applies to a detection target 180 according to a third modification and a detection target 200 according to a fifth modification described below.

As illustrated in FIGS. 10A and 10B, the detection target 170 according to the second modification includes a body portion 172 extending around the axis of the rotating shaft 90 and an attachment portion 110 disposed at one end of the body portion 172 in the direction of the arrow R1. The body portion 172 has a communication groove 174 through which ends of the two long grooves 154, 156 in the direction of the arrow R1 communicate with each other. The groove width of the communication groove 174 is greater than or equal to the diameter of the detector surface 124. In other words, the detector surface 124 is not covered with the body portion 172 while facing the communication groove 174.

In this modification, the two long grooves 154, 156 and the communication groove 174 define a substantially U-shaped groove 176 in the body portion 172. Consequently, the body portion 172 is further provided with the outer frame portion 158 and an intermediate portion 178 located between the long grooves 154, 156. The intermediate portion 178 extends around the axis of the rotating shaft 90. An end of the intermediate portion 178 in the direction of the arrow R2 is connected to the outer frame portion 158, and an end of the intermediate portion 178 in the direction of the arrow R1 is separate from the outer frame portion 158.

In a case where the above-described detection target 170 is used, in the initial state, the detector surface 124 of the proximity sensor 22 is disposed at the position P2 facing an end portion of the intermediate portion 178 in the direction of the arrow R2, and the sensor facing part 126 has an area S5.

As illustrated in FIGS. 10B and 10C, when a workpiece is clamped, the detector surface 124 is displaced relative to the body portion 172 in the direction of the arrow R1. As a result, the area of the sensor facing part 126 decreases, and the detected resonant impedance increases.

In a case where the detected resonant impedance is greater than the unclamp threshold Zb and less than the clamp threshold Za, the determining section 142 determines that it is in the intermediate state (a transition state from the unclamping state to the clamping state). When the detector surface 124 is displaced to the position P1 facing the communication groove 174, the area of the sensor facing part 126 becomes zero. At this time, the detected resonant impedance reaches the clamp threshold Za, and thus the determining section 142 determines that it is in the clamping state.

On the other hand, when the workpiece is released from the clamped state, the detector surface 124 is displaced relative to the body portion 172 in the direction of the arrow R2. As a result, the area of the sensor facing part 126 increases, and accordingly the detected resonant impedance decreases.

In a case where the detected resonant impedance is less than the clamp threshold Za and greater than the unclamp threshold Zb, the determining section 142 determines that it is in the intermediate state (a transition state from the clamping state to the unclamping state). When the detector surface 124 is displaced to the position P2 facing the end portion of the intermediate portion 178 in the direction of the arrow R2, the area of the sensor facing part 126 becomes S5. At this time, the detected resonant impedance reaches the unclamp threshold Zb, and thus the determining section 142 determines that it is in the unclamping state.

According to this modification, the groove width of the communication groove 174 is greater than or equal to the diameter of the detector surface 124. Thus, when the detector surface 124 is displaced to the position P1 facing the communication groove 174, the detected resonant impedance of the proximity sensor 22 can be made discontinuous (abruptly changed). Consequently, the clamping state can be reliably detected even if the detected resonant impedance of the proximity sensor 22 varies due to change in temperature of the environment in which the clamp device 10 is used.

The structure of the detection target 170 according to this modification is not limited to the structure described above. The communication groove 174 may allow ends of the two long grooves 154, 156 in the direction of the arrow R2 to communicate with each other. In this case, the unclamping state can be reliably detected even if the resonant impedance of the proximity sensor 22 varies due to change in temperature of the environment in which the clamp device 10 is used.

Next, the detection target 180 according to the third modification will be described with reference to FIGS. 11A to 11C. As illustrated in FIGS. 11A and 11B, the detection target 180 according to this modification includes a body portion 182 extending around the axis of the rotating shaft 90 and an attachment portion 110 disposed at one end of the body portion 182 in the direction of the arrow R1.

The body portion 182 has two long grooves 184, 186 extending around the axis of the rotating shaft 90 (i.e., extending in a direction along which the body portion 182 extends), the long grooves being arranged side by side in the width direction of the body portion 182. Consequently, the body portion 182 is further provided with a rectangular outer frame portion 158 located around the long grooves 184, 186 and an intermediate portion 188 located between the long grooves 184, 186. The intermediate portion 188 extends around the axis of the rotating shaft 90. Both ends of the intermediate portion 188 in a direction along which the intermediate portion 188 extends are connected to the outer frame portion 158.

Sides 184a, 186a of the long grooves 184, 186 closer to the intermediate portion 188 extend in a curved manner. In other words, the sides 184a, 186a of the long grooves 184, 186 extend in a curved manner so as to approach each other in the direction of the arrow R1. That is, the width of the intermediate portion 188 decreases in the direction of the arrow R1.

In a case where the above-described detection target 180 is used, in the initial state, the detector surface 124 of the proximity sensor 22 is disposed at the position P2 facing an end portion of the intermediate portion 188 in the direction of the arrow R2, and the sensor facing part 126 has an area S7.

As illustrated in FIGS. 11B and 11C, when a workpiece is clamped, the detector surface 124 is displaced relative to the body portion 182 in the direction of the arrow R1. As a result, the area of the sensor facing part 126 decreases, and the detected resonant impedance linearly increases. When the detector surface 124 is displaced to the position P1 facing an end portion of the intermediate portion 188 in the direction of the arrow R1, the area of the sensor facing part 126 becomes S6. Note that the area S6 is smaller than the area S7. At this time, the detected resonant impedance reaches the clamp threshold Za, and thus the determining section 142 determines that it is in the clamping state.

On the other hand, when the workpiece is released from the clamped state, the detector surface 124 is displaced relative to the body portion 182 in the direction of the arrow R2. As a result, the area of the sensor facing part 126 increases, and the detected resonant impedance linearly decreases. When the detector surface 124 is displaced to the position P2 facing the end portion of the intermediate portion 188 in the direction of the arrow R2, the area of the sensor facing part 126 becomes S7. At this time, the detected resonant impedance reaches the unclamp threshold Zb, and thus the determining section 142 determines that it is in the unclamping state.

According to this modification, the sides 184a, 186a of the long grooves 184, 186 extend in a curved manner. Thus, the resonant impedance of the proximity sensor 22 can be linearly changed. This enables detection of the rotational angle of the clamp arm 18.

Next, a detection target 190 according to a fourth modification will be described with reference to FIGS. 12A to 12C. In the detection target 190, the same reference numerals and symbols are used for components identical to those in the detection target 180 described above, and the detailed descriptions will be omitted. In addition, parts in the detection target 190 common to those in the detection target 180 described above produce the same operational effects as the detection target 180.

Figure 12C:
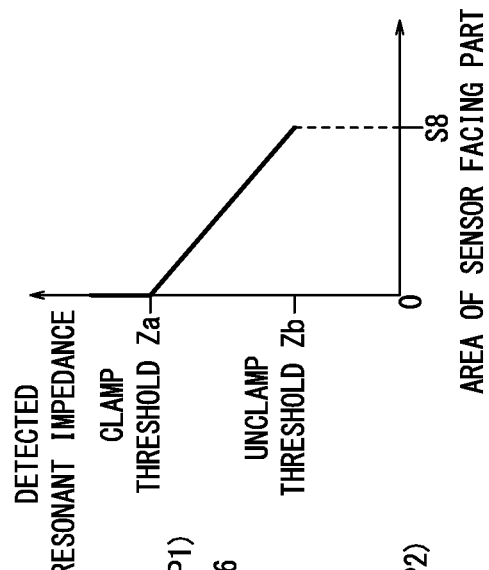
FIG. 12C is a graph illustrating a relationship between the area of the sensor facing part in the detection target and the detected resonant impedance.
Figure 12B:
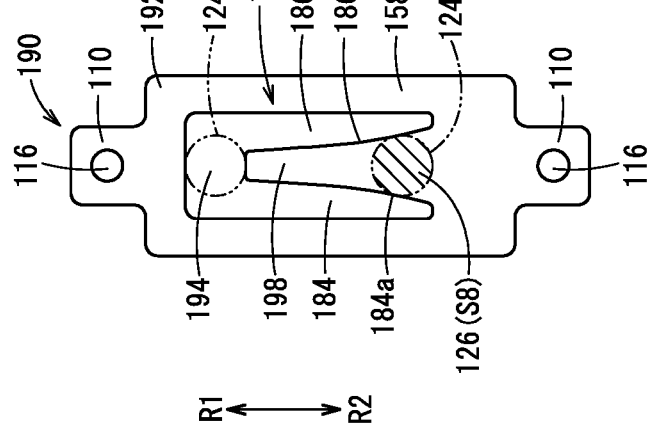
FIG. 12B is a development view of the detection target.
Figure 12A:
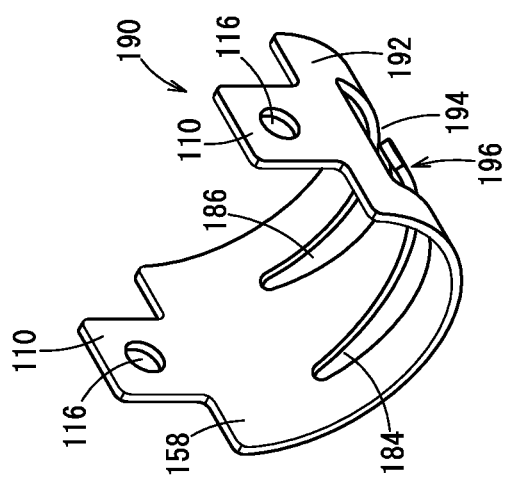
FIG. 12A is a perspective view of a detection target according to a fourth modification.

As illustrated in FIGS. 12A and 12B, the detection target 190 according to this modification includes a body portion 192 extending around the axis of the rotating shaft 90 and attachment portions 110 disposed at both ends of the body portion 192. The body portion 192 has a communication groove 194 through which ends of the two long grooves 184, 186 in the direction of the arrow R1 communicate with each other. The groove width of the communication groove 194 is greater than or equal to the diameter of the detector surface 124. In other words, the detector surface 124 is not covered with the body portion 192 while facing the communication groove 194.

In this modification, the two long grooves 184, 186 and the communication groove 194 define a substantially U-shaped groove 196 in the body portion 192. Consequently, the body portion 192 is further provided with the outer frame portion 158 and an intermediate portion 198 located between the long grooves 184, 186. The intermediate portion 198 extends around the axis of the rotating shaft 90. An end of the intermediate portion 198 in the direction of the arrow R2 is connected to the outer frame portion 158, and an end of the intermediate portion 198 in the direction of the arrow R1 is separate from the outer frame portion 158.

In a case where the above-described detection target 190 is used, in the initial state, the detector surface 124 of the proximity sensor 22 is disposed at the position P2 facing an end portion of the intermediate portion 198 in the direction of the arrow R2, and the sensor facing part 126 has an area S8.

As illustrated in FIGS. 12B and 12C, when a workpiece is clamped, the detector surface 124 is displaced relative to the body portion 192 in the direction of the arrow R1. As a result, the area of the sensor facing part 126 decreases, and the detected resonant impedance linearly increases. When the detector surface 124 is displaced to the position P1 facing the communication groove 194, the area of the sensor facing part 126 becomes zero. At this time, the detected resonant impedance reaches the clamp threshold Za, and thus the determining section 142 determines that it is in the clamping state.

On the other hand, when the workpiece is released from the clamped state, the detector surface 124 is displaced relative to the body portion 192 in the direction of the arrow R2. As a result, the area of the sensor facing part 126 increases, and the detected resonant impedance linearly decreases. When the detector surface 124 is displaced to the position P2 facing the end portion of the intermediate portion 198 in the direction of the arrow R2, the area of the sensor facing part 126 becomes S8. At this time, the detected resonant impedance reaches the unclamp threshold Zb, and thus the determining section 142 determines that it is in the unclamping state.

According to this modification, the attachment portions 110 are disposed at both ends of the body portion 192 in a direction along which the body portion 192 extends. This allows the detection target 190 to be secured more firmly to the rotating shaft 90 (support lever 86).

Figure 13:
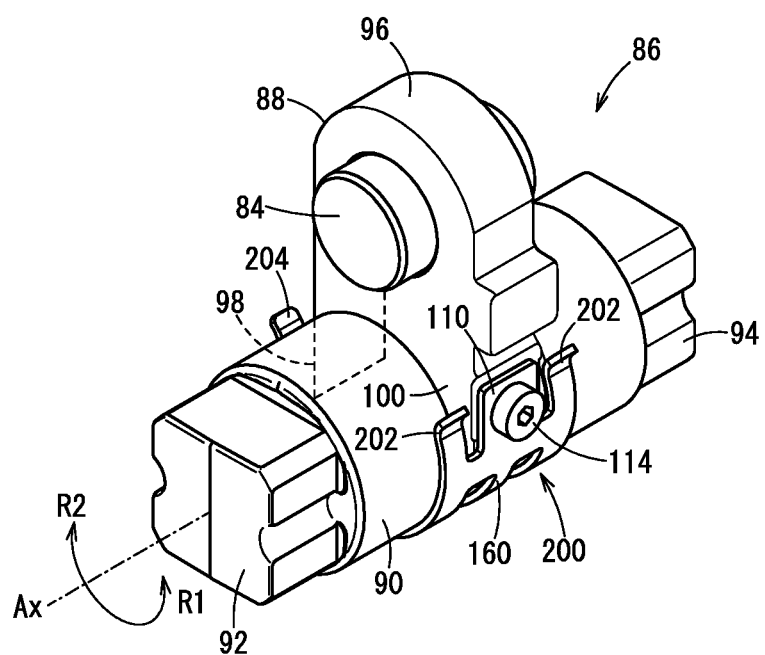
FIG. 13 is a perspective view illustrating a state where a detection target according to a fifth modification is attached to a rotating shaft.
Figure 14A:
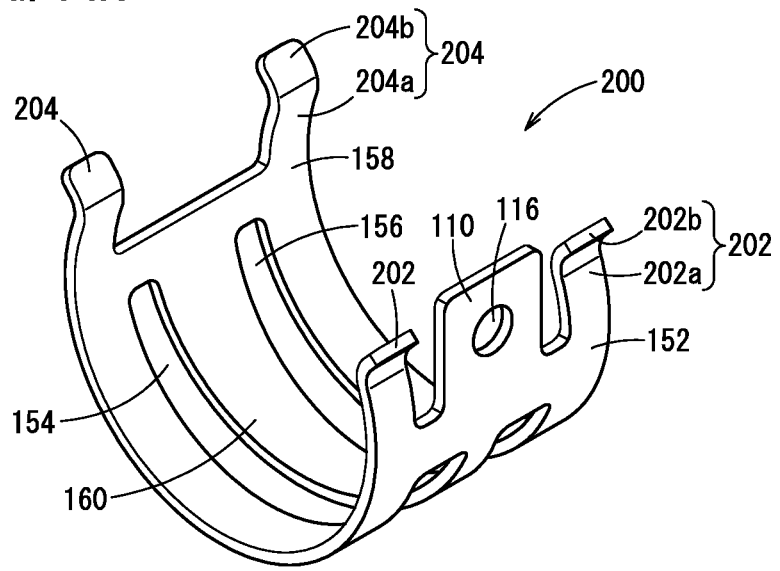
FIG. 14A is a perspective view of the detection target illustrated in FIG. 13.
Figure 14B:
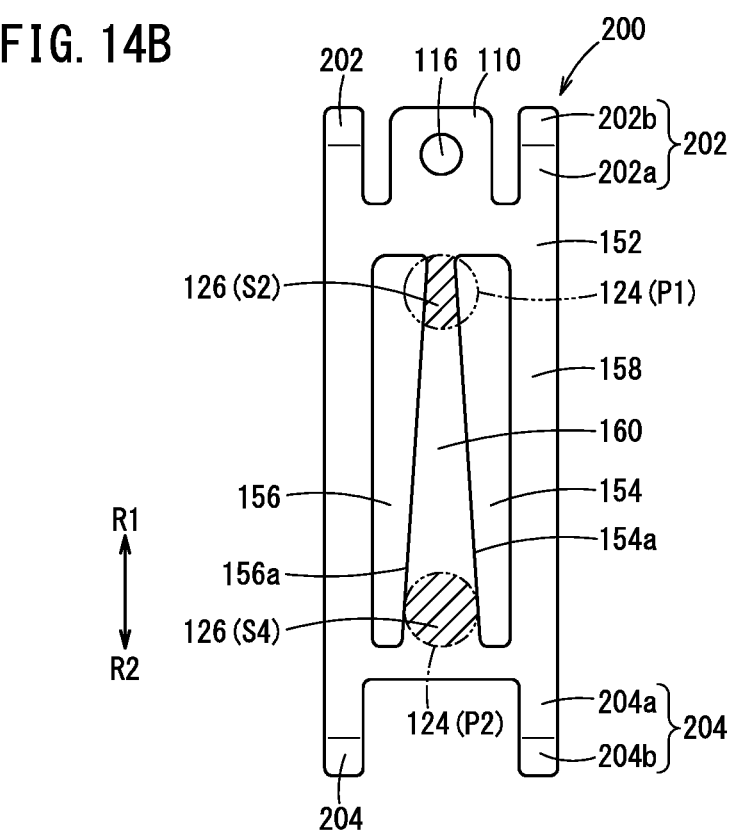
FIG. 14B is a development view of the detection target illustrated in FIG. 14A.

Next, the detection target 200 according to the fifth modification will be described with reference to FIGS. 13 to 14B. As illustrated in FIGS. 13 to 14B, the detection target 200 according to this modification includes two first holding portions 202 disposed at an end of the body portion 152 in the direction of the arrow R1 and two second holding portions 204 disposed at an end of the body portion 152 in the direction of the arrow R2.

The two first holding portions 202 are disposed at both ends of the body portion 152 in the width direction such that the attachment portion 110 is interposed between the first holding portions 202. A predetermined gap is formed between each of the first holding portions 202 and the attachment portion 110. The first holding portions 202 are elastically deformable in radial directions of the rotating shaft 90 (thickness direction of the detection target 200). More specifically, the first holding portions 202 each include a first protruding part 202a protruding from the body portion 152 in a direction along which the body portion 152 extends and a first receiving part 202b protruding from the distal end of the first protruding part 202a in the direction of the arrow R1 outward in a radial direction of the rotating shaft 90.

The two second holding portions 204 are disposed at both ends of the body portion 152 in the width direction so as to be separated from each other. The second holding portions 204 have a structure similar to the structure of the above-described first holding portions 202, and each include a second protruding part 204a protruding from the body portion 152 in the direction along which the rotating shaft 90 extends and a second receiving part 204b protruding from the distal end of the second protruding part 204a in the direction of the arrow R2 outward in a radial direction of the rotating shaft 90. The distance between the first holding portion 202 and the second holding portion 204 that face each other while the detection target 200 is not attached to the rotating shaft 90 is slightly smaller than the outer diameter of the rotating shaft 90.

In this modification, when the rotating shaft 90 is inserted into a space between the first holding portions 202 and the second holding portions 204, the first receiving parts 202b and the second receiving parts 204b are brought into contact with the outer circumferential surface of the rotating shaft 90 and are pressed radially outward, and then the first holding portions 202 and the second holding portions 204 are elastically deformed in a direction along which the first holding portions 202 and the second holding portions 204 are separated from each other (i.e. in a direction to be expanded and opened). When the detection target 200 is completely mounted on the rotating shaft 90, the first protruding parts 202a and the second protruding parts 204a are pressed against the outer circumferential surface of the rotating shaft 90 by a restoring force.

According to this modification, the first holding portions 202 and the second holding portions 204 hold the outer circumferential surface of the rotating shaft 90 from outside in the radial directions. Thus, the detection target 200 can be secured more firmly to the rotating shaft 90.

This embodiment is not limited to the structures described above. For example, each of the detection targets 20, 150, 170, 180, and 200 may have the attachment portions 110 disposed at both ends in the direction along which the detection target extends. Moreover, each of the detection targets 20, 150, 170, 180, and 190 may be provided with the first holding portions 202 and the second holding portions 204. Furthermore, the proximity sensor 22 may detect the rotational position of the clamp arm 18 based on change in inductance instead of resonant impedance.

The above-described detection targets 20 may be configured such that the area of the sensor facing part 126 decreases when the clamp device shifts from the unclamping state to the clamping state and such that the area of the sensor facing part 126 increases when the device shifts from the clamping state to the unclamping state. In this case, the detected resonant impedance increases when the state shifts from the unclamping state to the clamping state, and the detected resonant impedance decreases when the state shifts from the clamping state to the unclamping state.

In addition, the above-described detection targets 150, 170, 180 and 190 may be configured such that the area of the sensor facing part 126 increases when the device shifts from the unclamping state to the clamping state and such that the area of the sensor facing part 126 decreases when the device shifts from the clamping state to the unclamping state. In this case, the detected resonant impedance decreases when the state shifts from the unclamping state to the clamping state, and the detected resonant impedance increases when the state shifts from the clamping state to the unclamping state.

Each of the above-described detection targets 20, 150, 170, 180, and 190 is attached to the support lever 86 by screwing the screw member 114 into the screw hole 104 of the support lever 86 while the screw member 114 is inserted in the screw insertion hole 116 formed in the attachment portion 110. In other words, each of the detection targets 20, 150, 170, 180, and 190 includes the attachment portion 110 with the same dimensions. Thus, the detection targets 20, 150, 170, 180, and 190 can be easily changed. That is, by changing the detection targets 20, 150, 170, 180, 190, the requirements for various sensor characteristics can be easily fulfilled without changing the structure of the support lever 86 or the proximity sensor 22.

Specifically, for example, in a case where the detected resonant impedance of the clamping state needs to be accurately detected depending on the application of the clamp device 10, the detection targets 170 and 190, in which the area of the sensor facing part 126 in the clamping state is zero (the detected resonant impedance abruptly changes), may be used.

Moreover, for example, in a case where the clamping characteristic is changed (for example, in a case where the power transmission mechanism is changed from a toggle mechanism to a wedge mechanism), the characteristic of the clamping force is changed. Thus, a detection target suitable for the clamping characteristic may be used to simply and accurately detect the clamping state and the unclamping state.

Furthermore, in a case where the rotational angle range of the clamp arm 18 is changed, a detection target by which change in the area of the sensor facing part 126 occurs over the entire rotational angle range may be used to simply and accurately detect the clamping state and the unclamping state.

The clamp device according to the present invention is not limited to the above-described embodiment and may adopt various configurations without departing from the scope of the present invention as a matter of course.

The invention claimed is:

1. A clamp device configured to clamp a workpiece by a rotatable clamp arm, comprising:
   a clamp body;
   a driving unit provided on the clamp body;
   a rotating shaft configured to rotate together with the clamp arm in an integrated manner under operation of the driving unit;
   a detection target made of metal and provided on the rotating shaft so as to extend around an axis of the rotating shaft; and
   one proximity sensor disposed so as to face the detection target and configured to generate an eddy current in the detection target and detect magnetic loss;
   wherein the detection target is formed so that an area of a sensor facing part of the detection target that faces a detector surface of the proximity sensor changes with rotation of the rotating shaft.

2. The clamp device according to claim 1, wherein a side of the long groove linearly extends in a direction intersecting with the direction along which the detection target extends.

3. The clamp device according to claim 1, wherein a side of the long groove extends in a curved manner.

4. The clamp device according to claim 1, wherein:
   the long groove of the detection target includes one long groove; and
   the sensor facing part extends over both sides of the long groove.

5. The clamp device according to claim 1, wherein:
   the long groove of the detection target includes two long grooves arranged side by side in a width direction of the detection target; and
   the sensor facing part is disposed between the two long grooves.

6. The clamp device according to claim 5, wherein:
   the detection target includes a communication groove through which ends of the two long grooves communicate with each other; and
   a groove width of the communication groove is greater than or equal to a diameter of the detector surface.

7. The clamp device according to claim 1, wherein the detection target is secured to the rotating shaft by a screw member.

8. The clamp device according to claim 7, wherein an attachment portion having an insertion hole into which the screw member is inserted is disposed at at least one end of the detection target in the direction along which the detection target extends.

9. The clamp device according to claim 7, wherein holding portions configured to hold an outer circumferential surface of the rotating shaft from outside in radial directions are disposed at both ends of the detection target in the direction along which the detection target extends.

10. The clamp device according to claim 1, wherein a recess portion is formed in a region of an outer circumferential surface of the rotating shaft that faces the detector surface.

* * * * *